United States Patent [19]

Branscome

[11] Patent Number: 5,540,395
[45] Date of Patent: Jul. 30, 1996

[54] CONCRETE CYCLONE RECLAIMER

[75] Inventor: Henry S. Branscome, Williamsburg, Va.

[73] Assignee: Henry Mfg. Co., Williamsburg, Va.

[21] Appl. No.: 315,624

[22] Filed: Sep. 30, 1994

[51] Int. Cl.⁶ .................................................. B02C 9/04
[52] U.S. Cl. ............... 241/39; 241/41; 241/72; 241/74; 241/79.3
[58] Field of Search ................. 241/39, 41, 72, 241/74, 79, 79.1, 79.2, 79.3

[56] References Cited

U.S. PATENT DOCUMENTS

| | | |
|---|---|---|
| 788,675 | 5/1905 | Rissmuller .................. 241/79.3 X |
| 1,378,623 | 5/1921 | Schaffer . |
| 1,458,387 | 6/1923 | Bourne . |
| 1,461,067 | 7/1923 | Moser . |
| 1,577,136 | 3/1926 | Markman . |
| 2,174,836 | 10/1939 | Range . |
| 2,200,677 | 5/1940 | Petersen ...................... 241/72 X |
| 2,942,731 | 6/1960 | Soldini . |
| 2,983,378 | 5/1961 | Hilkemeier . |
| 3,181,842 | 5/1965 | Eckert . |
| 3,459,380 | 8/1969 | Kartman ...................... 241/72 X |
| 3,614,003 | 10/1971 | Tremolada ...................... 241/79.3 |
| 4,013,233 | 3/1977 | Nylund ......................... 241/79.3 X |
| 4,127,478 | 11/1978 | Miller . |
| 4,140,629 | 2/1979 | Martindale . |
| 4,236,999 | 12/1980 | Burgess et al. . |
| 4,267,980 | 5/1981 | Lapoint . |
| 4,418,871 | 12/1983 | Powell . |
| 4,613,084 | 9/1986 | Takamoto et al. ................ 241/72 X |
| 4,616,786 | 10/1986 | Riker . |
| 5,016,827 | 5/1991 | Didion ............................ 241/79.3 |
| 5,082,553 | 1/1992 | Tanii . |
| 5,108,584 | 4/1992 | Brosseuk . |
| 5,234,172 | 8/1993 | Chupka et al. . |
| 5,312,051 | 5/1994 | Preisser . |

FOREIGN PATENT DOCUMENTS 1457994  2/1989  U.S.S.R. .................. 241/72

OTHER PUBLICATIONS

An advertisement form p. 1 of the Mar./Apr. 1994 issue of "Ready Mix—A Pit & Quarry Publication".

Primary Examiner—Timothy V. Eley
Attorney, Agent, or Firm—Greenblum & Bernstein, P.L.C.

[57] ABSTRACT

The present invention is a novel concrete reclaimer cylinder with a closed chamber and a screen chamber. The reclaimer is disposed in a non-horizontal position such that screen chamber is positioned lower than the closed chamber and driven to rotate. Concrete product is received into the closed chamber at its receiving end and is washed with water to produce cement slurry. The cement slurry is floated out of the closed chamber at the receiving end leaving a mixture of sand and gravel in the closed chamber. The sand and gravel mixture is advanced through the closed chamber by four triangular blades. Each blade is planar in shape, with a perpendicular portion extending from the front edge to direct the sand and gravel mixture through an aperture and into the screen chamber. The sand and gravel mixture is received in a rotating screen and washed by high pressure spray to separate the two constituents. The sand permeates the rotating screen while the gravel remains inside the rotating screen. The cement slurry, sand and gravel are collected in separate containers for future use.

9 Claims, 4 Drawing Sheets

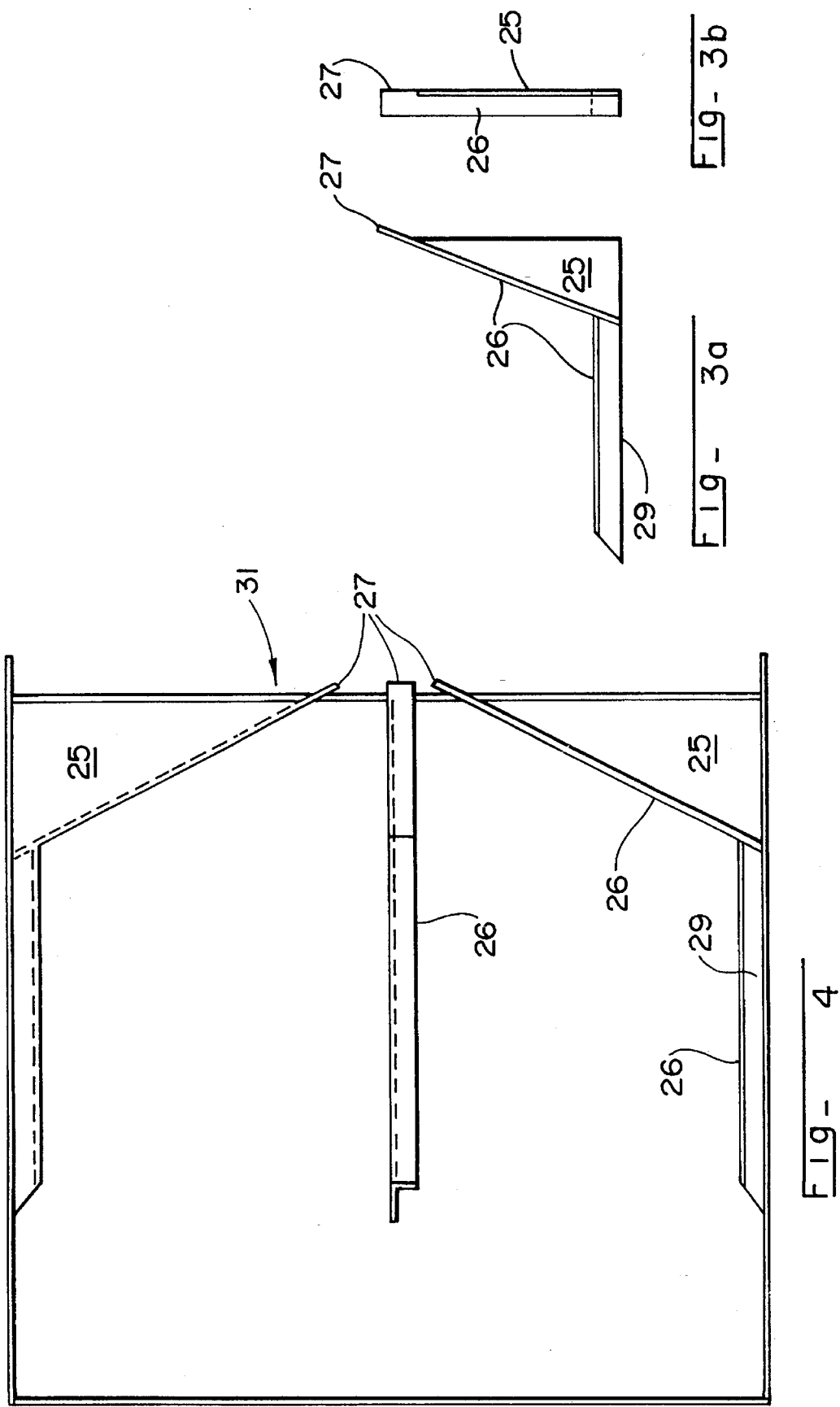

CONCRETE CYCLONE RECLAIMER

BACKGROUND OF THE INVENTION

1. Field of the Invention

The present invention relates to the structure and method of concrete reclaiming. The instant invention allows the user to easily separate cement slurry, sand and gravel from mixed concrete for future use.

2. Description of Background Information

It is known to breakdown mixed concrete to its constituent parts of cement slurry, sand and gravel. It is also well known to employ rotating screens or trommels for filtering and separating different sized granules of sand and gravel in the reclaimer. There are reclaimers that employ screw type conveyors for advancing product through the reclaimer and there are reclaimers that use only the force of gravity to advance their product.

In screw type conveyor reclaimers, the screw conveyor is required to extend along the entire length of the reclaimer cylinder. In the screen chambers of such reclaimers there is a likelihood of clogging or jamming due to the screw conveyor forcing product past the screen element.

Additionally, such reclaimers are inefficient because they work against the force of gravity. Screw conveyors force the product through the reclaimer chambers instead of allowing the force of gravity to move the product.

In reclaimers employing only gravity for advancing product through the reclaimer chamber, several screen chambers or trommels are required for reducing the mixed concrete to its constituent parts. Such reclaimers may allow too much product into the reclaimer chamber. In this event, the forces of gravity may pull the concrete mixture past the screen chamber before the mixture is fully filtered or separated for the relevant granule size.

PREISSER, U.S. Pat. No. 5,312,051, discloses a declining reclaimer apparatus with a plurality of rotating screens of increasing mesh size. As shown in FIGS. 1 and 2, fresh concrete poured into the upper inclined end 22 of the reclaimer migrates to the lower declined end. As the concrete runs through the plurality of rotating screen chambers 14a, 14b, the concrete mixture is separated into cement slurry A, sand S and gravel G. This device requires separate screens for the cement slurry A and sand S. Gravel G is discharged through the end of the reclaimer. Because this particular apparatus provides no means for regulating the admission of mixed concrete into the opening 22, too much concrete may be in chambers 14a, 14b resulting in improper filtration or separation. This improper result is due to the pull of gravity on the concrete product through the particular screen chambers before the product is fully filtered.

TANII, U.S. Pat. No. 5,082,553, discloses a concrete reclaimer apparatus that moves the mixed concrete product through the device by a screw type conveyor means. FIG. 3 shows that the device requires a screw conveyor 16 to move the mixed concrete into the screen chamber 9. Another screw conveyor 24 is required to move the product through the screen chamber 9 and to discharge reclaimed gravel into chute 26a, 26b. A third screw conveyor 27 is required to discharge the sand 18 into chute 30a, 30b. This device suffers from the same drawbacks as other screw conveyor type reclaimers in that the device may become clogged or jammed. While this particular device provides a method and means for jam relief, this device is unable to avoid a jam. This device is also inefficient in that it works against the force of gravity by pushing the concrete mixture through the reclaimer by screw conveyor means 16, 24, 27.

MILLER, U.S. Pat. No. 4,127,478, discloses an inclined concrete reclaimer. FIG. 1 shows the mixed concrete product inserted into chute 18. The product is advanced upward and through the reclaimer by screw conveyor 22 past screens 26, 27. The screens 26, 27 filter fine and coarse sand granules. This device suffers from a propensity to clog or jam. Also, this device is wholly inefficient. Not only does this device push product through the reclaimer, but it pushes the product upward against the force of gravity. MILLER also provides a means for rotating the reclaimer in which drive wheels 20 are disposed on either side of the lower declined end of the reclaimer. On the upper inclined end are a pair of idler wheels 21. This arrangement is inefficient. The drive wheels 20 are required to not only rotate the reclaimer chamber 19, but also to advance the concrete product upward against the force of gravity.

HILKEMAIER, U.S. Pat. No. 2,983,378, discloses an inclined concrete reclaimer requiring only one screen to separate the mixed concrete into its constituent parts of cement slurry, sand and gravel. FIG. 2 shows the reclaimer apparatus in which a screw conveyor 15, 16 is employed to push the mixed concrete up and through the screen chamber 26 and discharge end 8. This device suffers from the same inefficiency and propensity to clog or jam as the other screw type inclined concrete reclaiming apparatuses.

SUMMARY OF THE INVENTION

One object of the present invention is to provide a concrete reclaimer apparatus that employs unique product advancing blades for moving the mixed concrete product through the reclaimer chamber.

Another object of the present invention is to provide a reclaimer apparatus that also enlists the aid of gravity for advancing the mixed concrete product through the reclaimer chamber.

Another object of the present invention is to provide a concrete reclaimer apparatus that requires only one screen for filtering and separating the mixed concrete into its constituent parts of cement slurry, sand and gravel.

Another object of the present invention is to provide a reclaimer apparatus with a high pressure spray nozzle within the screen chamber to facilitate the filtration and separation of the concrete product.

Yet another object of the present invention is to provide a method of filtering and separating mixed concrete into its constituent parts through the combined use of unique product advancing blades and gravity.

Yet another object of the present invention is to provide a concrete reclaimer apparatus with a pair of drive wheels disposed on a common side of the reclaimer device and a pair of idler wheels disposed on another common side opposite the drive wheels.

Still another object of the present invention is to provide a reclaimer apparatus in which the drive wheels are connect by an common axle rotated by a differential gear, said differential gear being driven by an electric motor connected thereto.

A further object of the present invention is to describe a novel concrete reclaimer cylinder with a closed chamber and a screen chamber. The reclaimer is disposed in a nonhorizontal position such that screen chamber is positioned lower than the closed chamber. The reclaimer is driven to rotate. Concrete product is received into the closed chamber at its receiving end and is washed with water to produce cement slurry. The cement slurry is floated out of the closed chamber at the receiving end leaving a mixture of sand and gravel in the closed chamber. The sand and gravel mixture is advanced through the closed chamber by four to eight triangular blades. Each blade is planar in shape, with a perpendicular portion extending from the front edge to direct the sand and gravel mixture through an aperture and into the screen chamber. The sand and gravel mixture is received in a rotating screen and washed by high pressure spray to separate the two constituents. The sand permeates the rotating screen while the gravel remains inside the rotating screen.

A still further object of the present invention is to disclose a novel concrete reclaiming method for separating concrete into its constituent parts. Concrete is fed into a rotating closed chamber oriented to enable the concrete passage through the closed chamber by the force of gravity. By adding water to the concrete, cement slurry to be floated out of the closed chamber is produced leaving only a mixture of sand and gravel to be separated. A plurality of blades, revolving about the center-point of said closed chamber, and the force of gravity direct the sand and gravel mixture through an aperture into a screen chamber with a rotating screen. Once in the rotating screen, the mixture is subjected to a high pressure wash causing the sand particles to permeate the screen and leaving the gravel chunks remaining in the screen chamber. The cement slurry, sand and gravel are collected in separate containers for future use.

Other objects and advantages of the present invention and advantageous features thereof will become apparent as the description of the invention proceeds herein.

BRIEF DESCRIPTION OF THE DRAWINGS

The present invention is further explained in the description which follows with reference to the drawings, illustrating, by way of non limiting examples, various embodiments of the invention, with like reference numerals representing similar parts throughout the several views, and wherein:

FIGS. 3a and 3b are a side and front view, respectively, of the blades of the concrete reclaimer.

FIG. 4 is a sectional view illustrating the closed drum chamber and its blade configuration.

DETAILED DESCRIPTION OF THE PREFERRED EMBODIMENTS

Figure 1:
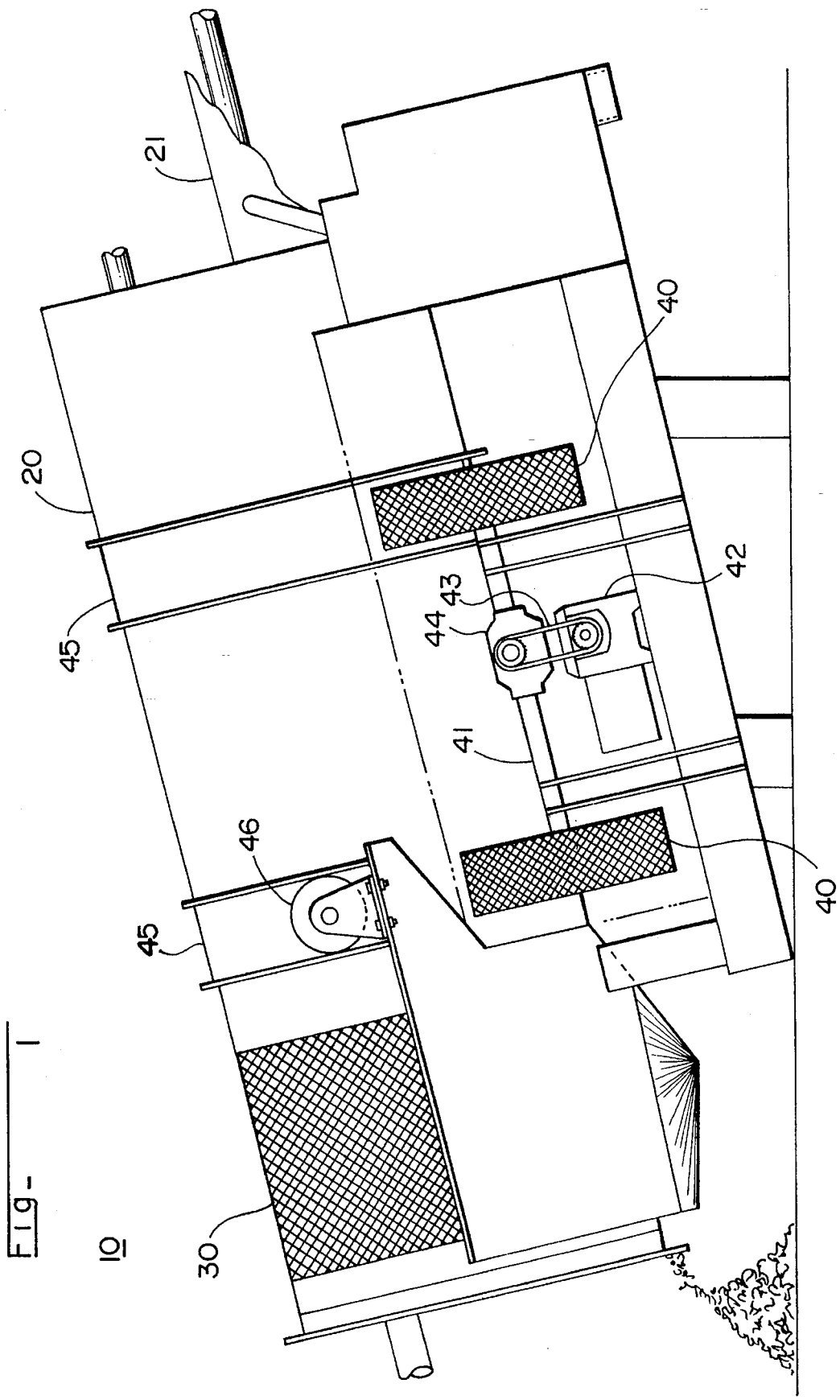
FIG. 1 is a side view of the concrete reclaimer.
Figure 5:
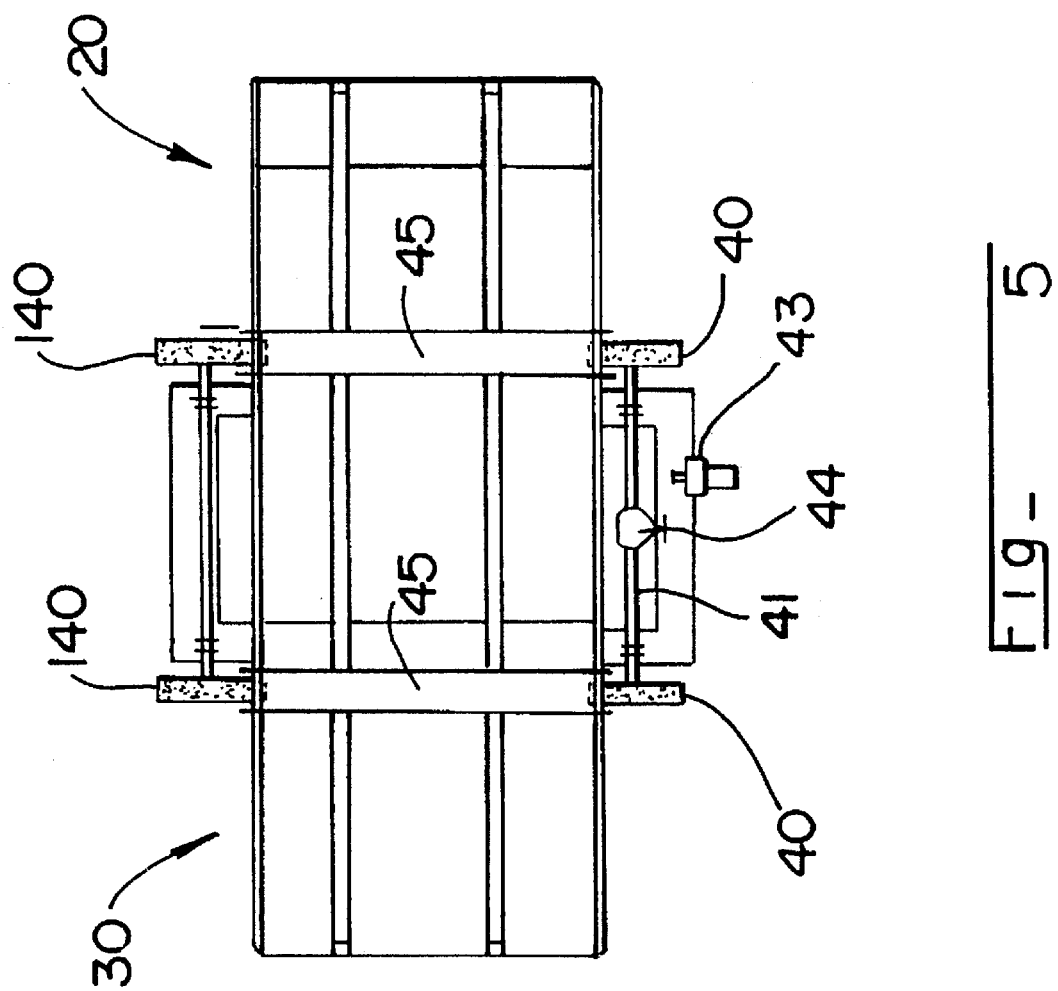
FIG. 5 is a bottom view of the concrete reclaimer.

Referring now to the drawings in detail, FIG. 1 shows a side view of a cylindrical concrete reclaimer apparatus 10 oriented in a non-horizontal position. The reclaimer apparatus 10 is comprised of closed drum chamber 20 and screen chamber 30. The reclaimer 10, as shown in FIG. 5, is positioned upon a pair of drive wheels 40 disposed on one side of the reclaimer and a pair of idler wheels 140, disposed on the opposite side of the reclaimer. Rotation of reclaimer 10 is imparted by the drive wheels 40. Drive wheels 40 are connected together via a common axle 41. An electric motor 42, through a chain belt 43, drives the differential gear 44 of axle 41 thereby driving drive wheels 40.

Drive wheel guides 45 are disposed along the length of reclaimer 10. The drive wheels 40 and the idler wheels contact the surface of reclaimer cylinder 10, imparting rotational force thereto, in wheel guides 45. A thrust roller 46 is also disposed within a wheel guide 45 to inhibit longitudinal movement of the reclaimer.

Figure 2:
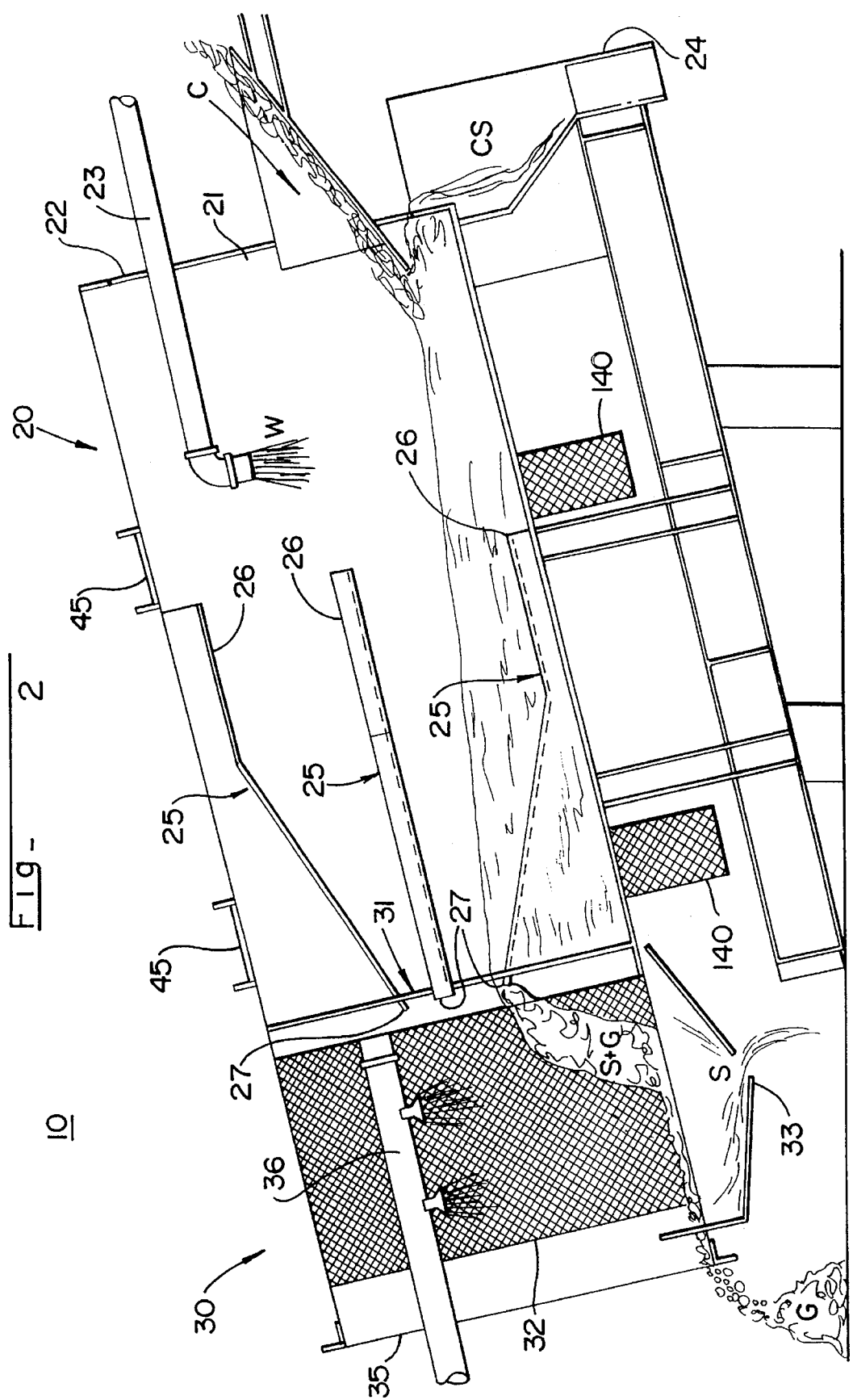
FIG. 2 is a sectional view illustrating the internal configuration of the concrete reclaimer.

FIG. 2 shows an sectional side view of the interior of concrete reclaimer cylinder 10. The reclaimer cylinder 10 is comprised of closed drum chamber 20 and screen chamber 30. The reclaimer cylinder 10 is disposed in a non-horizontal position such that the closed drum chamber 20 is disposed at a level higher than the screen chamber 30. The mixed concrete product C is inserted into a rotating reclaimer cylinder 10. Thus, as the mixed concrete product C is dispensed into the rotating closed drum chamber 20, the force of gravity will aid and cause the product to gravitate toward and through the screen chamber 30.

An in-feed chute 21 is disposed at an opening 22 of chamber 20 for receiving mixed concrete C. A water pipe 23 is also disposed in opening 22 for adding water W to the mixed concrete C in chamber 20. As the mixed concrete C and water W combine in chamber 20, cement slurry CS is separated from the sand and gravel. The cement slurry CS floats above the sand and gravel in closed drum chamber 20 and flows out of the chamber 20 through opening 22. The cement slurry CS is collected in a slurry discharge pipe 24.

Inside chamber 20 are several blades 25 for advancing the sand and gravel mixture through an aperture 31 into screen chamber 30. Aperture 31 is an opening in separating wall 28 that separates closed drum chamber 20 and screen chamber 30. Each blade 25 is substantially triangular in shape as shown in FIGS. 3a, 3b, and 4. Blade 25 includes a substantially right triangle. The surface of the blade 25 is substantially planar with a perpendicular "L" portion 26 extending from the front edge (hypotenuse) of blade 25 to scoop the sand and gravel mixture and direct the mixture through aperture 31. The tip 27 of blade 25 penetrates the aperture 31. The leg of triangular blade 25 connected to tip 27 is mounted on separating wall 28 and the other leg of blade 25 is mounted on the inside wall of closed drum chamber 20. An arm 29, mounted on the inside wall of closed drum chamber 20, extends from the base leg of blade 25. Arm 29 is also provided with a perpendicular "L" portion extending from the front edge along its entire length.

A discharge end 35 is provided opposite the aperture 31 at the outer end of the screen chamber 30. A high pressure spray nozzle 36 is disposed within screen chamber 30 through the discharge end 35. The high pressure spray nozzle 36 washes down the sand and gravel mixture in the screen chamber. As the sand and gravel mixture is introduced through aperture 31 and subjected to the high pressure spray of nozzle 36, the combination of spraying and rotation cause the finer granules of sand S to pass through the trommel 32 while the coarser grade of gravel G remains in the screen chamber 30. The sand S is collected in the sand discharge chute 33. The gravel G too coarse to pass through the trommel is discharged out of the discharge end 35.

While the preferred embodiment of this invention employs a one-quarter inch mesh screen for trommel 32, those ordinarily skilled in the art will note that other size mesh may be used depending upon the grade of sand or gravel to be separated.

Of course, it is clear that the present invention is not limited to the embodiments described above, nor those illustrated in the drawings, and the invention can be modified without departing from the spirit and scope of the claimed invention.

What is claimed is:

1. A concrete reclaimer apparatus comprising a closed chamber and a screen chamber;

said closed chamber comprising a receiving end and a plurality of blades;

said screen chamber comprising a discharge end and a screen means;

said closed chamber and said screen chamber separated by an aperture;

said plurality of blades penetrating said aperture; and said apparatus oriented in a non-horizontal position.

2. The concrete reclaimer apparatus according to claim 1 wherein said discharge end is disposed lower than said receiving end.

3. The concrete reclaimer apparatus according to claim 1 wherein said screen chamber comprises a plurality of high pressure nozzles.

4. The concrete reclaimer apparatus according to claim 1 wherein each of said plurality of blades in substantially planar and comprises a triangular portion; said triangular portion having a front edge.

5. The concrete reclaimer apparatus according to claim 4 wherein each of said blades comprises a directing means disposed perpendicular to the front edge.

6. The concrete reclaimer apparatus according to claim 1 further comprising a drive means for rotating said apparatus;

said drive means comprising a pair of drive wheels disposed on a side of said apparatus and a single axle comprising a differential gear means;

said drive wheels driven by a motor connected to said differential gear means.

7. The concrete reclaimer apparatus according to claim 1, said receiving means further comprising a slurry discharge for floating out cement slurry.

8. The concrete reclaimer apparatus according to claim 1, said screen means separating sand and gravel.

9. A concrete reclaimer apparatus comprising a closed chamber and a screen chamber;

said closed chamber comprising a receiving end for receiving concrete product;

said closed chamber further comprising a plurality of blades;

each of said plurality of blades being substantially planar and comprising a triangular portion;

said triangular portion comprising a front edge;

said front edge comprising a directing means perpendicular thereto;

said screen chamber comprising a screen means;

said screen chamber having a discharge end for discharging gravel;

said closed chamber and said screen chamber separated by an aperture;

said apparatus disposed in a non-horizontal orientation such that said discharge end is positioned lower than said receiving end.

* * * * *

UNITED STATES PATENT AND TRADEMARK OFFICE
CERTIFICATE OF CORRECTION

PATENT NO. : 5,540,395
DATED : July 30, 1996
INVENTOR(S) : Henry S. BRANSCOME

It is certified that error appears in the above-indentified patent and that said Letters Patent is hereby corrected as shown below:

At column 5, line 20 (claim 4, line 2), change "in" to ---is---.

Signed and Sealed this

First Day of April, 1997

Attest:

BRUCE LEHMAN

*Attesting Officer*      *Commissioner of Patents and Trademarks*